Figure 1:
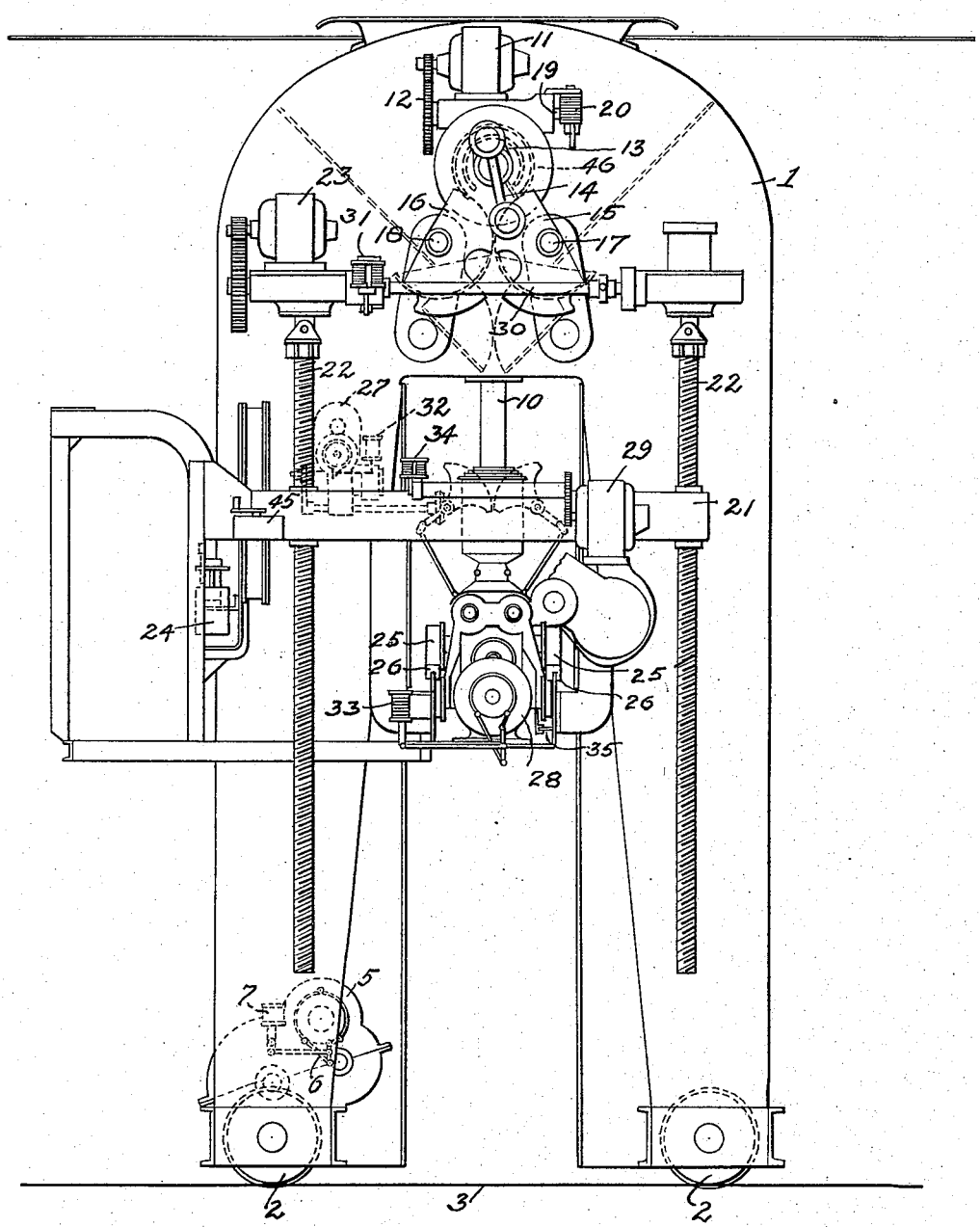

H. A. CARPENTER, R. L. HIBBARD & A. W. WARNER.
CHARGING AND DISCHARGING APPARATUS.
APPLICATION FILED DEC. 2, 1914.

1,171,414.

Patented Feb. 15, 1916.
5 SHEETS—SHEET 1.

WITNESSES

INVENTORS

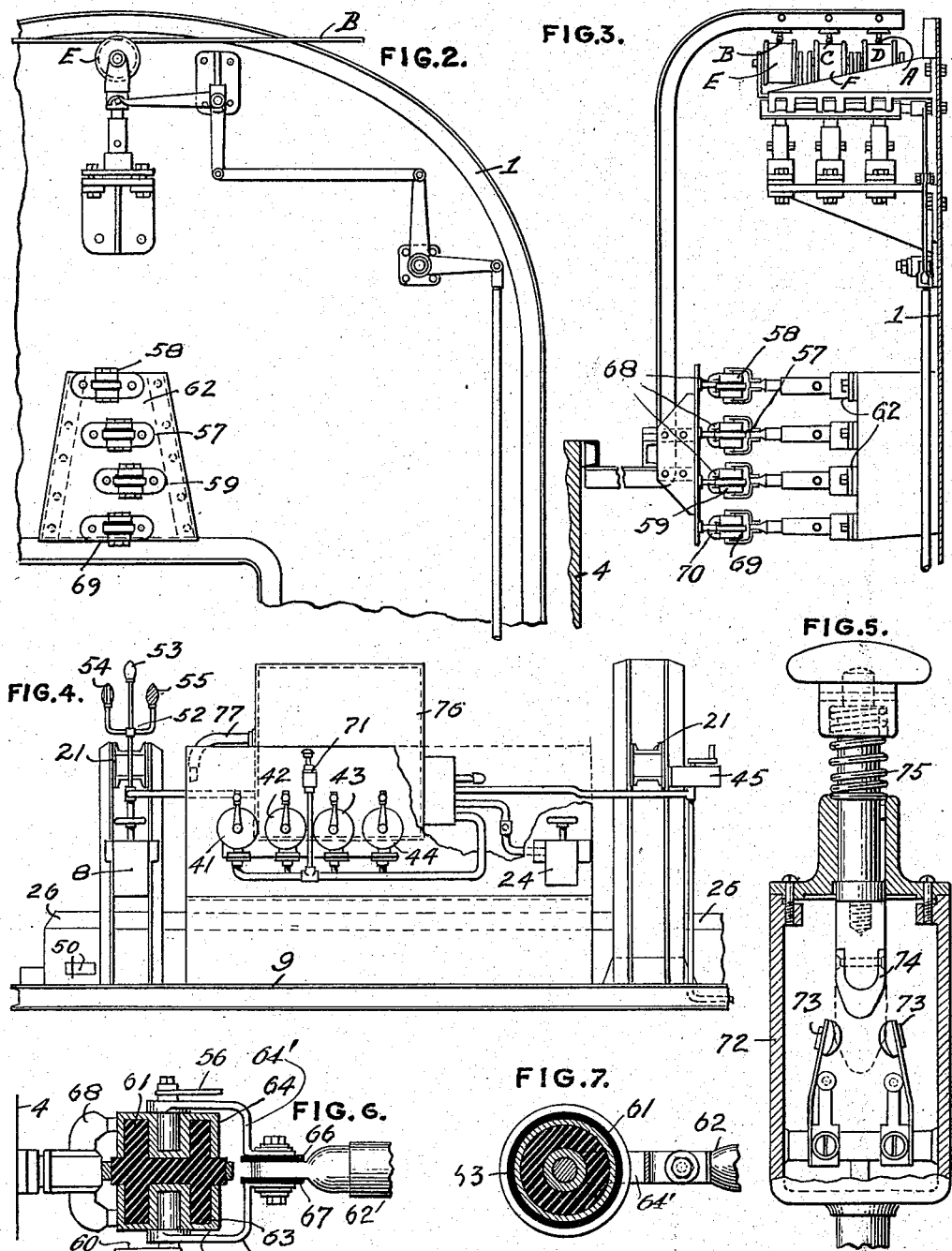

H. A. CARPENTER, R. L. HIBBARD & A. W. WARNER.
CHARGING AND DISCHARGING APPARATUS.
APPLICATION FILED DEC. 2, 1914.

1,171,414.

Patented Feb. 15, 1916.
5 SHEETS—SHEET 3.

WITNESSES

INVENTORS

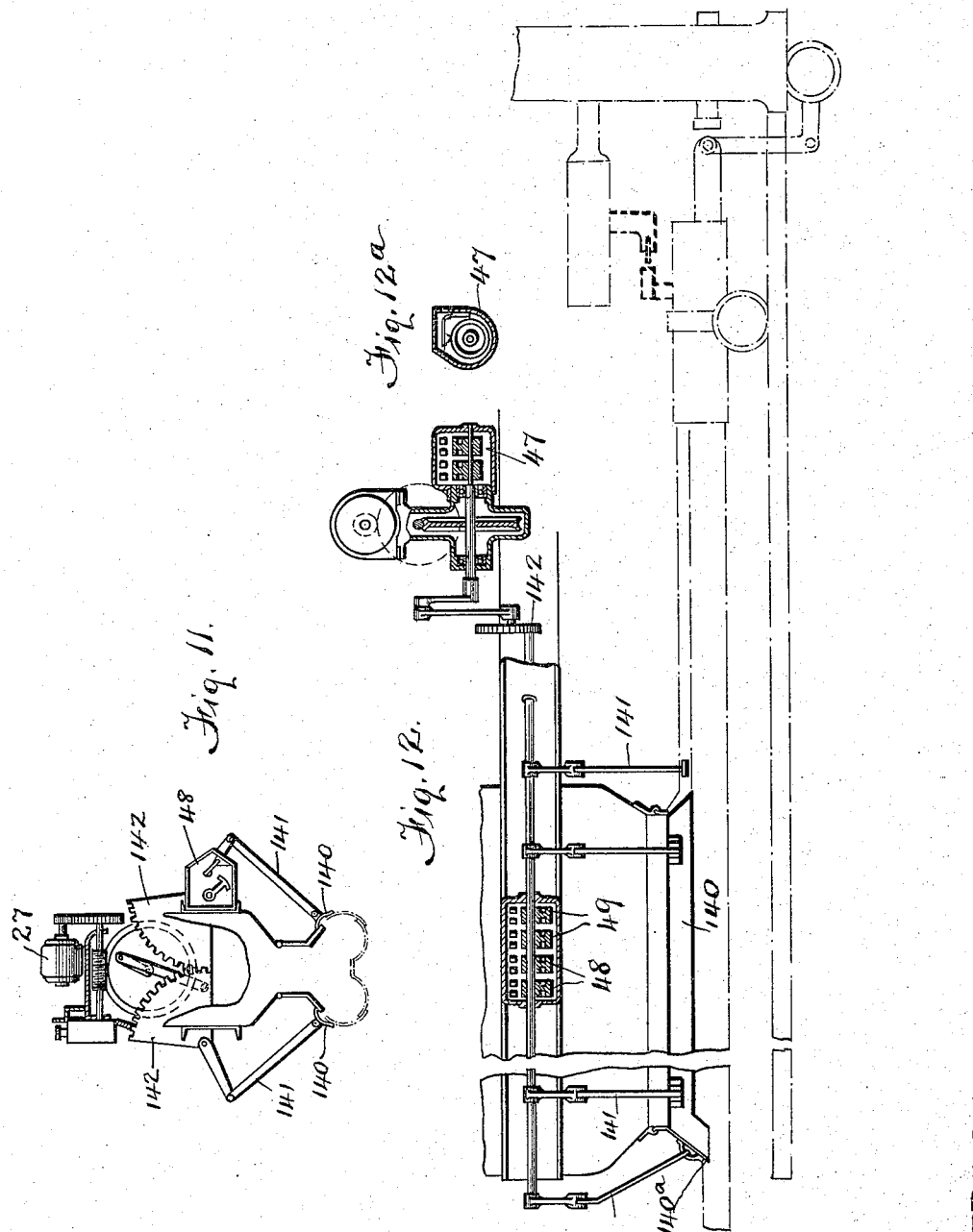

UNITED STATES PATENT OFFICE.

HENRY A. CARPENTER, ROBERT L. HIBBARD, AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

CHARGING AND DISCHARGING APPARATUS.

1,171,414. Specification of Letters Patent. Patented Feb. 15, 1916.

Application filed December 2, 1914. Serial No. 875,208.

*To all whom it may concern:*

Be it known that we, HENRY A. CARPENTER, ROBERT L. HIBBARD, and ARTHUR W. WARNER, citizens of the United States, residing at Sewickley, in the county of Allegheny and State of Pennsylvania, have invented certain new and useful Improvements in Charging and Discharging Apparatus, of which the following is a specification.

The prime object of our invention is to provide new and improved means for operating discharging and charging apparatus particularly designed for use in connection with the manufacture of gas, and the present invention particularly relates to means for controlling the operations of the various electric motors employed for operating the parts of the apparatus.

The apparatus employed in connection with our present invention relates to that class of charging and discharging apparatus described in pending applications for patents, Serial No. 530,383, filed November 29, 1909, and Serial No. 748,644, filed February 15, 1913. The apparatus therein shown is especially designed for charging and discharging horizontally disposed retorts arranged in rows in various gas benches constituting a stack of benches.

In operating gas generating apparatus of this character, it is customary to charge and discharge the retorts intermittently at predetermined intervals. To enable this result to be readily obtained, various means are employed for performing the necessary operations to produce the result. For instance, one of the essentials is to provide for the travel of the charging machine along the stack of retorts, thus enabling the machine to be positioned opposite any desired vertical row of retorts within the stack. As it is impossible that the charging mechanism be positionable opposite each particular retort of such vertical row at the same time means are provided for raising or lowering the charger, thus enabling the charge of coal to be introduced to any predetermined retort of the row. This particular means is more particularly referred to as the hoist mechanism, and while this means is operable independently of the travel mechanism, the operation of the two sets of mechanism at proper times, will enable the charger to be positioned opposite any predetermined retort of the stack.

The general idea of applying independent travel and hoist mechanisms is disclosed and more particularly claimed in the said companion application, Serial No. 530,383, in addition to which said application discloses various mechanisms for providing a cycle of operations which are employed in the charging operations, this cycle being substantially automatic and comprising the following successive steps: (*a*) move the carriage forward, (*b*) invert the scoops to dump the charge, (*c*) reverse the movement of the carriage to withdraw the scoops, and (*d*) aright the scoops, these various operations being provided by the use of independent scoop and carriage mechanisms, each motor driven, and having controlling devices by means of which the several operations will be automatically brought into action. In addition, the said copending application discloses a feeder mechanism by means of which a new charge of coal may be placed in the charger by the operator, suitable controls being provided for this purpose. The present invention retains these general features of the travel and hoist mechanisms, together with the charging cycle referred to. However, the general control referred to has been greatly elaborated in the present invention with a view to providing for greater security against damaging the equipment, as well as increasing the cycle of charging operation in order to reduce the liability of the operator accidentally or intentionally disturbing the sequence of operations which go to increase the efficiency of the apparatus. One addition is the inclusion of a wing structure specifically described in the companion application, Serial No. 748,644, referred to, this mechanism performing the function of making a substantially dust-proof conduit for the coal from the hopper to the charger, and the additional function of acting to some extent in shaping the charge as the coal is deposited within the charger. The particular feature of this latter mechanism in the present application is in connection with the particular control mechanism which is employed to include it within the cycle, this mechanism being adapted to be operated at predetermined times in the cycle of operations, its normal position providing the closed conduit, and its operation to open the inclosing wings providing the first step in the automatic cycle.

Another feature is the use of a plurality of automatic controls, each acting in connection with the individual mechanism of which it forms a part and by which it is given a movement to carry it through a control cycle, certain of the controls coöperating with other mechanisms for the purpose of providing timing elements in bringing the mechanisms into predetermined operations sequence; included in the latter is the ability to automatically rearrange circuits to by-pass safety devices which are effective at the start of a mechanism operation.

Another feature is to include the feeder mechanism as a part of this automatic operation, thus automatically placing a charge in the charger ready for further operation without requiring special attention of the operator and thus enable him to give his undivided attention to the travel movements in moving from one retort to another while the feeder mechanism is in operation, and thus provide a saving in time in the general operation.

Another and very important feature is the provision of means which will enable the operator to aline the charger in proper position opposite the retort to be charged, this means including signals which will enable the operator to determine the proper adjusting movements to be made by the travel mechanism in order to provide this alinement without the necessity of visually noting the relative positions of the charger and the retort to be charged. This is an important feature in view of the saving of time and of labor in placing the charger in position, and further reduces the liability of the operator beginning the cycle of operations while out of proper alinement, this latter being prevented by employing this alinement mechanism for the purpose of completing the circuit which starts the initial step of the charging operation, so that the automatic charging cannot take place until the alining mechanism is in a predetermined position with respect to a row of retorts.

Another feature is the ability to operate these several mechanisms independently, but with the circuit connections so arranged that independent operation cannot take place while the apparatus is set for automatic operation, this being an additional safeguard against accidental manipulation by the operator.

The various mechanisms are operated by independent electrical motors, the operations of which are provided by the opening and closing of motor circuits, either manually or automatically, thus placing the entire control of the operation in the hands of an operator whose work is simplified through the use of various safeguards and other protective devices so as to greatly reduce the liability of accidental errors in operation or intentional operations which would tend to damage the equipment.

Various other features are indicated hereinafter, all coöperating to provide for efficiency in operation with a possibility of a reduction in the cost of the gas producing operation.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

Figure 8:
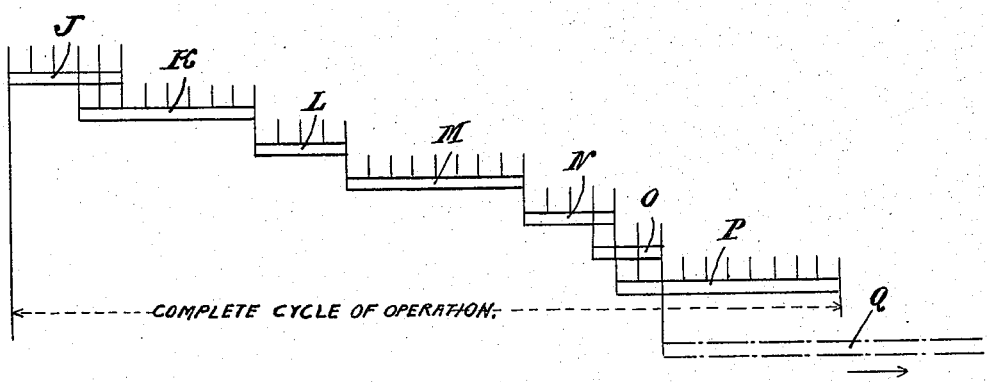
Figure 9:
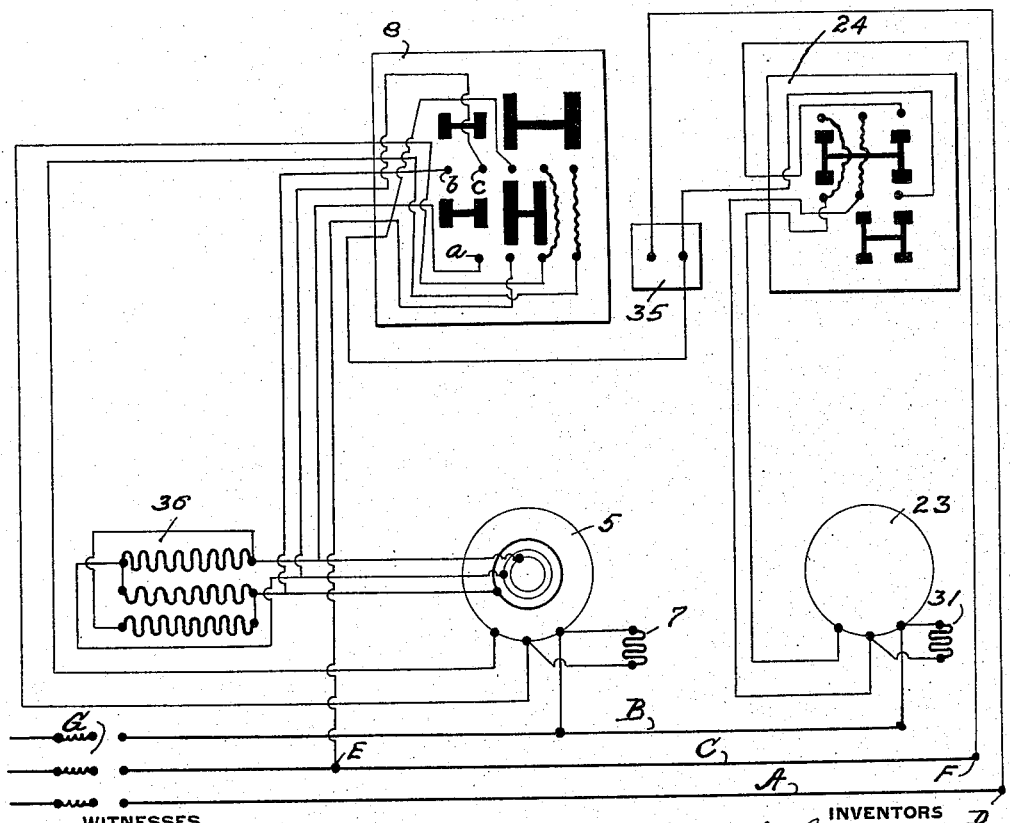
Figure 10:
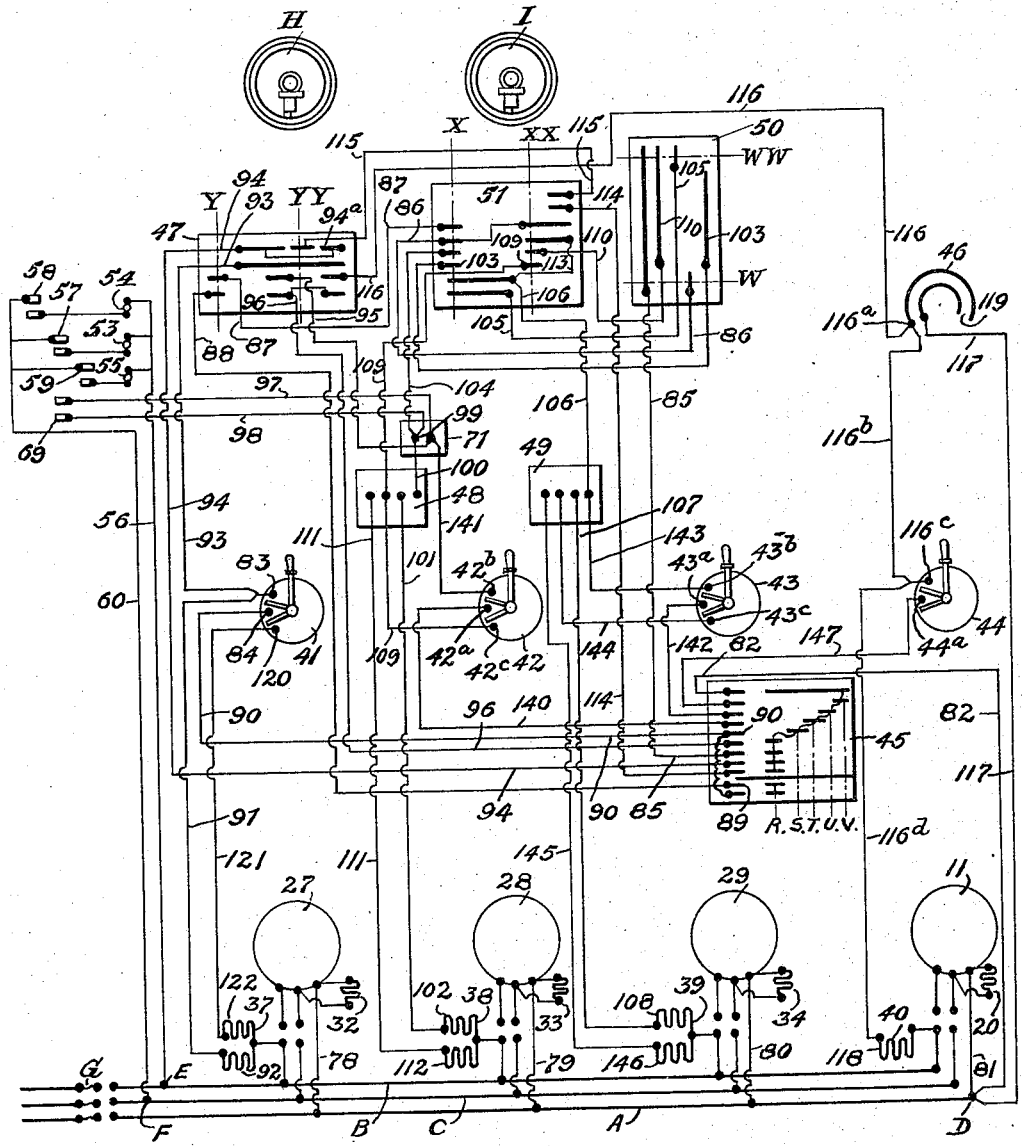

In the accompanying drawings, which illustrate one application of our invention, and in which similar reference characters indicate similar parts in each of the views, Figure 1 is an elevation, largely diagrammatic, of a charging and discharging apparatus showing the relative positions of the parts and the several motors employed; Figs. 2 and 3 are diagrammatic views taken at the top of the apparatus and particularly showing the feed wires, trolleys, and contact members; Fig. 4 is a diagrammatic view particularly showing a platform, controllers and signaling lights carried thereon; Fig. 5 is a detailed vertical sectional view of a switch mechanism; Fig. 6 is a part plan and a part sectional view of a contact member carried by the frame of the apparatus; Fig. 7 is a part sectional and part elevational view of the member shown by Fig. 6; Fig. 8 is a diagram showing a complete cycle of operations; Fig. 9 is a diagrammatic view illustrating the travel and hoist motors and the various electrical connections therefor; and Fig. 10 is a view similar to Fig. 9 showing the wing, carriage, scoops, and feeder motors, and the various electrical connections therefor employed in our improved system of control; Fig. 11 is a diagrammatic view indicating the wing structure, the forward wing being omitted; Fig. 12 is a side elevation of the parts shown in Fig. 1, portions of the scoop and carriage mechanism being shown in dotted lines; Fig. 12$^a$ is a detailed view of the wing motor automatic switch.

Referring to the drawings, and first to the diagrammatic views of Figs. 1, 2 and 3, which illustrate discharging and charging apparatus and operating mechanisms, with our present invention shown in connection therewith, 1 designates the frame of the apparatus mounted on wheels 2, and designed to travel on a track 3 disposed in front of a stack of gas benches. A portion of said stack of benches is indicated by the numeral 4 (see Fig. 3). Travel of the frame along the track 3 is effected by means of a travel motor 5 and intermediate mechanism located between the motor and the wheels 2. Travel motor 5 is connected with and receives current from feed or line wires hereinafter described. In connection with the motor 5, we employ a brake 6 and actuating means for said brake, said actuating means including a solenoid 7. Said travel motor controller is designated by the numeral 8, and is mounted on an operating platform 9, the latter being suspended from the main frame 1 of the apparatus by screws 22.

At the top of the apparatus, we provide a coal bin, shown in dotted lines, from which coal is fed into a telescopic chute 10, and for the purpose of controlling the feed of coal or fuel from the bin to the chute, we provide a motor 11 and intermediate mechanism including gearing 12 and a crank 13, the latter being connected with a rod 14, said rod having its lower end connected with a gear sector 15. The sectors 15 and 16 are respectively mounted on shafts 17 and 18, and the latter are connected with gates, shown in dotted lines, of the feeder mechanism. The feeder gate mechanism, in addition to the parts enumerated above, includes a worm shaft 19 located in a casing, said worm shaft being provided with a brake operated by a solenoid 20.

The charging and discharging apparatus as fully described in the applications aforesaid, comprises, in addition to the parts described herein, a charger and discharger proper, preferably comprising scoop members mounted on a carriage and adapted to be entered and withdrawn from the retorts of the stack of benches whereby coke is discharged from and fuel introduced to the retorts; closure means or wings for preventing the escape of dust, etc., located between the discharge end of the telescopic chute and the scoops; together with separate motors for operating the wings, carriage, and scoops. All of the parts or mechanisms just mentioned are adapted to be moved vertically with respect to the frame of the apparatus and relatively to the benches in order to bring the charger and discharger into the proper alinement with the various retorts of the benches. As illustrated herein, these means are supported from or by girders 21, which girders are adapted to be raised and lowered by means of screws 22 operated by a hoist motor 23 provided with a controller 24, and intermediate mechanism, fully described in the applications aforesaid. As herein shown, the carriage carrying the scoops of the charger and discharger is mounted on wheels 25 designed to travel upon track 26, the latter being supported by the girders 21.

27, 28 and 29, respectively, designate the wing motor, the carriage motor and the scoop motor. In practice, the vertically disposed screws 22 are in operative engagement with the hoist motor 23. As illustrated, the screws 22 are connected by means of a worm shaft 30 disposed in a casing 30′, and other connections, not shown. The worm shaft is equipped with a brake, controlled by a solenoid 31, adapted to release the brake whenever hoist motor 23 operates, and apply the same when current to the motor is broken. Motors 27, 28 and 29 are also equipped with brake-operating solenoids 32, 33 and 34, which together with solenoids 7 and 20 of motors 5 and 11 above referred to, operate to apply and release their respective brake mechanisms in a manner similar to that of solenoid 31 just described.

The wing structure shown diagrammatically in the companion application Serial No. 748,644 is shown diagrammatically in Fig. 1. A simplified arrangement is shown more particularly in Figs. 11, 12 and 12$^a$, in which side wings 140 and forward wing 140$^a$ are shown as operatively connected to a pair of segments 142 by connections 141, the segments 142 being geared together and adapted to be operated by motor 27 through connections which include a crank and a rod connecting the crank to one of the segments. As will be understood, the closed position of the wings are shown in Figs. 11 and 12, the wings being moved to open position by the rotation of the crank through half its revolution, this latter raising the wings to their open position, this forming the first stage of the wing action hereinafter referred to, the second stage of operation of wing motor 27 continues the movement of the crank and restores the parts to the position shown in these views.

As shown in Fig. 9, travel motor 5 and hoist motor 23, together with their respective controllers 8 and 24, are in circuit with main trolley lines A, B and C, and in order to prevent either motor from operating until the charger and discharger is entirely withdrawn from the retorts, we provide a safety switch 35 common to both controllers, and which may be located at any convenient point on the apparatus, such for instance, as at the rear end of the scoop carriage. The hoist controller 24 is of the single speed reversible type, while controller 8 is a two-speed reversible, its motor 5 being provided with three commutator rings wired to include a resistance box 36 through which the induced current in the armature is made to pass when the motor is running on low or first speed. When the motor is running on high or second speed, the resistance is cut out at points $a$, $b$ and $c$ in controller 8. Controllers 8 and 24 are both manually operated and are located at the left and right hand ends, respectively, of platform 9, as shown in Fig. 4. This particular arrangement of travel and hoist mechanisms is generally along the lines of that indicated in the companion application, Serial No. 530,383, the various features being more particularly claimed in a division of that application filed October 3, 1914, Serial No. 864,787; consequently these features are not specifically claimed in the present application.

Motors 27, 28, 29 and 11 are each provided with solenoid operated switches 37, 38, 39 and 40, respectively. The switches 37, 38 and 39 each include two solenoids, one of which causes its motor to operate clockwise, and the other in the reverse direction, while feeder motor switch 40 has but one solenoid and is non-reversing. In addition to the switches just referred to, motors 27, 28, 29 and 11 are each provided with a manual controller 41, 42, 43 and 44, respectively, and said controllers are in turn directly under the control of a master controller 45, through the medium of which the entire cycle of operations shown diagrammatically in Fig. 8 may also be made to follow each other automatically in proper sequence, in a manner to be presently described.

The apparatus also includes a feeder drive switch 46, wing drive switch 47, two wing shaft safety switches 48 and 49, carriage screw switch 50, and scoop drive switch 51, all of which are located at convenient points and operated by their respective moving parts. The function of switch 48 is to prevent carriage starting unless wings are raised, while switch 49 prevents the turning of the scoops when the wings are closed. Both of these switches are operated simultaneously with the movement of the wings. The other switches above referred to automatically open and close the various circuits during the operation of the device.

By reference to Fig. 4, it will be seen that controllers 41, 42, 43, 44 and master controller 45 are mounted upon platform 9 which also carries at one end adjacent controller 8 a system of three signal lights 52, comprising a central white light 53, with a red light 54 and a green light 55 located on opposite sides thereof, the object of said lights being to indicate to the operator the position of the apparatus relative to a stack of retorts; that is to say, the red light indicates the apparatus is too far to the left, the green light too far to the right, and the white light, that it is centrally in line with the retorts in position for the charger and discharger to enter therein.

By reference to Figs. 2, 3 and 10, it will be seen that the arrangement of the wiring and operation of the lights is as follows: Each light has one contact connected directly to a wire 56 leading to one of the main trolley contacts E traveling on main line wire B, the other contacts being connected to circuit breakers 57, 58 and 59 connected to a wire 60 leading through trolley F to main line wire C. As shown in Figs. 2, 3, 6 and 7, each of the circuit breakers 57, 58 and 59 comprises a roller 61 carried upon a bracket 62 secured to the forward face of main frame 1 near its top and centrally in line therewith and adjacent the retort bench 4. Each of said rollers comprises a central core 63 composed of insulation and provided upon its opposite ends with contact caps 64 and 65. These caps are trunnioned on harps 64' and 65' insulated from each other by insulation 66 and 67 and held together by insulated bolts. Suitable binding posts are provided to connect harps 64' and 65' to wires 56 and 60, respectively. Caps 64 and 65 of rollers 61 are adapted to bear against contact members 68 secured to the face of the retort bench 4 and insulated from it, adjacent frame 1, centrally in line with and above each vertical row of retorts.

As contact rollers 58 and 59 are located on each side of and out of line with roller 57, it will be been that when the circuit is completed through either of the rollers coming in contact with its correponding contact member 68, the light will indicate to the operator the position of the charging apparatus with reference to the row of retorts, as hereinafter described. A fourth contact roller 69 is located directly below roller 59 but in line with white light roller 57 and is adapted to engage a contact member 70 also secured to the face of bench 4, which mechanism is adapted to make and break the main circuit controlling the operation of the charger and discharger, simultaneously with the opening and closing of the circuit leading to white light 53, thus rendering it impossible to operate the charger and discharger until it is centrally in line with a row of retorts. Should it be desired to operate the charger and discharger when it is away from the retort benches, the main circuit may be closed by means of a switch 71 located upon platform 9, between controllers 42 and 43, (Fig. 4). Any preferred form of switch may be used for this purpose, such for example, as that shown in Fig. 5, comprising a casing 72, provided with spring contact fingers 73 adapted to bear upon each side of a vertically movable contact point 74 normally held up and out of engagement by means of a spring 75. Said switch is only used to close the main circuit when it is desired to test the machine away from the retort benches, and will not be further referred to in describing the operation of the device.

Platform 9 also carries a junction box 76, (see Fig. 4) provided with a goose neck 77 through which the main wires and those to return to control on main frame work lead by means of a flexible cable, and from which box the wires are distributed to the various motors, controlling the charger and discharger, but for the purpose of better illustration, said box has been omitted from Fig. 10.

The main trolley lines A, B and C are provided with a circuit breaker or main cut-out switch G, and current is applied from said wires to the various motors above referred to through trolleys D, E and F as follows: Line A is led direct through wires 78, 79, 80 and 81, respectively, to motors 27, 28, 29 and 11. Lines B and C are led direct to the four solenoid-operated switches 37, 38, 39 and 40, and from thence to motors 27, 28, 29 and 11, when a switch solenoid is caused to operate. It will be understood by those skilled in the art that switches 37, 38 and 39 being of the reversing type, the corresponding motors may be caused to rotate in either direction, while feeder solenoid switch 40 being non-reversing, its motor will always rotate in one direction, said switch being only to open and close the circuit.

Assuming that the machine is loaded with coal and standing under the coal bin, with carriage back, scoops aright and filled with coal, and wings closed, the operation is as follows: The operator first hoists the scoops to the desired elevation and then travels the machine toward the retort to be charged; he then opens the retort and continues to travel a short distance until the white light 53 shows. Should either the green or red light show, it indicates that the scoops are not centrally in line with the retorts, and he then moves either forward or back as indicated by the color of the light until the white light shows. Being thus centered, the line-up safety circuit is closed through contact 69 and the apparatus is in condition to perform the cycle of operations shown diagrammatically in Fig. 8. In this diagram, J indicates a period corresponding to the opening of the wings, which action takes them out of the path of movement of the charge and leaves the carriage ready for its forward movement, this latter being indicated at K; as shown in the drawings, these movements may overlap, it being necessary only that the wing shall have had sufficient time to clear the charge before the carriage begins its movement. As the movement is dependent upon the movements of a safety switch operated by the wing mechanism (as hereinafter referred to) this overlapping action is readily controlled. The carriage completes its forward movement at the end of which the scoops are inverted, this action being represented at L, and this inverting action is followed by a return movement of the carriage, as indicated at M, the return movement being with the scoops in their inverted positions. The scoops are arighted at the end of the carriage return movement, this being indicated at N, and this action is followed by a return of the wings to their closing position, this latter being indicated at O. As the wings do not reach their final position immediately, the beginning of the wing-closing operation may take place during the latter moments of the scoop-arighting operation, this being indicated by the overlapping. This wing-closing action places the mechanism in condition to receive the succeeding charge, and this is provided by the operations of the feeder motor, this latter operation being indicated at P. As shown, the wing-closing and feeder-operating steps may overlap, thus saving in the time of operation, the wings reaching their closed position before the charge actually reaches the scoops. As will be obvious, the apparatus may begin its travel movements without waiting a completion of the feeder operation, and this is indicated at Q.

The cycle of operations just described beginning with J and ending with P may be performed automatically after wing motor 27 has been started, by a proper setting of the master controller 45. The master controller, however, is also arranged to permit of manual control of the several motor operations individually. While, as shown in Fig. 10, the circuits are so arranged that motors 27 and 29 operate in the same direction during the successive operations of these motors when they are operating under the automatic operation, the manual controls 41 and 43 for these motors are so arranged as to provide for operation of these two motors in either direction, permitting either motor to reverse the operation should the same be found necessary; in this connection, safety switch 49 is provided with a pair of make-and-break points, both points being active in connection with the manual control, but only one of said points being active in the automatic control.

An inspection of Fig. 10 will indicate that the circuits are so arranged that after the automatic action has been started by the movement of manual control 41, none of the manual controls are effective in the several circuits, said control 41 being effective simply by reason of its use in starting the automatic operation; nor can any two of the motors 27, 28, 29 and 11 be rendered active concurrently when such concurrent activity would provide conflict in the sequential operation; as shown in Fig. 8, concurrent activity may be had, but this activity is only when the mechanisms operated by the motors are in positions where no damage to the equipment can result from such concurrent action. These results are obtained through the particular circuits and make-and-break devices employed, and act as safeguards against an operator injuring the apparatus by operating a wrong controller. The various circuits, switches, controllers, etc., by which this cycle of operations just described may be performed, are shown diagrammatically in Fig. 10, the manner in which the various circuits are completed for the automatic operation being as follows: At this point, it should be noted that each of the automatic controls 46, 47, 50 and 51 are movable in synchronism with the mechanisms of which they form the principal control; in addition, the safety devices 48 and 49 are also movable with the wing mechanism, the make-and-break points of these devices being adapted to close the circuits in these devices when the wing mechanism is in predetermined positions.

Assuming the apparatus to be in line with a retort which it is desired to charge, this fact being indicated by white light 53, with the scoops aright at the proper elevation and containing a charge of coal (the positions indicated at X, switch 51) with the carriage back (the position indicated at W, switch 50), and with the wings closed (the position indicated at Y, switch 47), (in these positions, switches 48 and 49 will have the circuit broken therein at the make-and-break points), the operations will be as follows; each of the several manual controllers, including the master controller, are assumed to be in circuit breaking positions as is the switch 46.

Assuming the charging operation to be automatic in its action, the master controller 45 is first shifted so as to bring the line of automatic contact points indicated at R in proper position with respect to the contact fingers of the controller, this action providing certain connections of lines and leads which will be more particularly pointed out, one of the principal connections being that from line lead A to the master controller through lead 82, thus bringing one of the main trolley leads to the master controller. This action completes a starting circuit with the exception of one point, viz., the wing manual controller 41, so that when the operator is ready to start the charging operation, it is only necessary that this manual controller 41 be manipulated to close this make-and-break point, whereupon, the sequence of operations begins.

When the operator provides a movement to the handle of manual controller 41 toward the right (a movement toward the left would be ineffective with the master controller in this position), a circuit is completed from main lead A to main lead B as follows: from line A to lead 82, master controller 45, lead 85, carriage control 50, lead 86, scoop control 51, lead 87, wing control 47, lead 88, master controller 45, contacts 89, lead 90 to point 84 on manual control 41, through said control to point 83, lead 91, solenoid 92, to line B, the completion of this circuit acting to energize solenoid 92 and to complete the operating circuit for wing motor 27, which then begins its operation, the movement of which acts to move the automatic control 47 and switches 48 and 49. As will be seen, the completion of this circuit was possible only by reason of automatic controls 50 and 51 being in certain positions, these controls having make-and-break devices operative in this circuit so as to prevent a start of the sequential operation unless the carriage and scoop mechanisms are in certain predetermined positions. As will be understood, after the operation has started, these safeguards relative to the carriage and scoop mechanisms may be by-passed, since the movements of these parts from these predetermined positions is dependent upon the operations of their respective motors. Advantage is taken of this fact by rearranging the wing motor circuit after the wing motor has started operation, the operator retaining the initial circuit closed at the manual control 41 until the rearrangement is completed. This rearrangement is had by breaking this initial circuit within the wing automatic control 47, this break being had by the fingers coasting off of the contacts of leads 87 and 88, the new circuit being established through the bridging of contacts which form terminals of leads 93 and 94 in this automatic control 47, the rearranged circuit running from lead line A, through lead 82, master controller 45, lead 94, control 47, lead 93, to point 83 of manual control 41, lead 91, solenoid 92, to line B, thus retaining solenoid 92 energized and continuing the operation of wing motor 27 until the finger of control 47 which coacts with the contact of lead 94 coasts off of that contact and breaks the circuit, whereupon, the wing motor comes to rest. As will be seen, the rearranging of this wing motor circuit has entirely by-passed both carriage and scoop automatic controls.

As shown by the timing diagram of Fig. 8, the wing and carriage forward operations overlap. This action is provided by closing a circuit for the carriage motor in the wing automatic control 47, this being provided by bridging the terminals of leads 95 and 96 during the latter portion of the travel of the wing control heretofore described. This action completes a circuit from line A to line B as follows: line A, lead 82, master controller 45, lead 96, wing control 47, lead 95, to switch 71 (to which the make-and-break device 69 is attached), the circuit continuing through lead 97, circuit make-and-break device 69, lead 98, to point 99, from where it passes to safety switch 48 through lead 100 which was connected with lead 101 by the movement of the wing mechanism as heretofore referred to, and thence from lead 101 to solenoid 102, and to line B. The completion of this circuit energizes solenoid 102 with the result that the motor circuit for carriage motor 28 is closed to operate the motor in a direction to drive the carriage forward. In connection with this particular circuit, several features are present, as follows: The circuit can only be completed when the wing mechanism has reached a predetermined point in its operation, thus providing a safeguard against premature movement of the carriage. The circuit can only be completed when the make-and-break device 69 is in proper position, thus insuring that the scoops are lined up with the retort to be charged. The circuit is entirely independent of the carriage automatic control 50, and is also independent of the manual controller 42, the time control being provided entirely by the wing mechanism operation.

As heretofore stated, the wing motor comes to rest as the circuit to that motor is broken between leads 93 and 94, this breaking of the circuit stopping the drive of motor 27 and permitting it and its mechanism to coast to rest, this resting position being indicated by the line YY in wing control 47; as shown, this action has also caused the circuit for the carriage motor just described to be broken between leads 95 and 96 through fingers coasting off the contacts. However, activity of the carriage motor just described had the effect to begin the operations of the carriage motor to drive the carriage forward, this action causing the movable parts of carriage automatic control 50 to move through the synchronous relation between the carriage mechanism and this control, the result being that a movement is provided which brings lead 85 into connection with lead 103 of the carriage control 50, this taking place as the circuit through control 47 is broken. The bridging of leads 85 and 103 in control 50 results in completing a circuit through a solenoid 102 as follows: line A, lead 82, master controller 45, lead 85, lead 103, scoop control 51, lead 104, to the point 99, from which point it continues to line B in the manner referred to in connection with the previous circuit, viz, lead 100, safety switch 48, lead 101, solenoid 102, to line B. As will be seen, this action has had the effect of rearranging the circuit for solenoid 102, the control of the circuit being shifted from wing automatic control 47 to carriage automatic control 50, and at the same time, a by-passing action has been had with respect to the make-and-break device 69 of the safety line-up, this latter eliminating any liability of the carriage motor circuit being broken by jars, etc., which might disarrange the make-and-break at point 69. As will be readily understood, while the carriage motor circuit is originally completed through and controlled by the wing control 47, and thus causes the latter to provide the proper timing point in the cycle of operations, the rearranging of the circuit transfers this control from wing control 47 into carriage control 50, so that the stoppage of the wing control is immaterial with respect to the carriage motor circuit, the automatic control for that circuit being transferred to the control 50 which is operated by the carriage mechanism. The carriage motor continues its operation until the circuit is broken between leads 85 and 103 in the carriage control 50, through the fingers coasting off of the contact of lead 103; as a result, the drive of the carriage motor is stopped and the mechanism coasts to its final position, which leaves the part coöperating with the contacts of control 50 on the line WW.

As shown in Fig. 8, the carriage forward movement is followed by an inverting of the scoops, and this action is provided by closing the scoop motor circuit at the proper time, this time, as shown in Fig. 8, being when the carriage forward movement is completed, thus causing the scoops to be in a predetermined position within the retort before the inverting movement takes place. This timing is provided within the carriage control 50, the circuit which controls the energizing of the solenoid which completes the scoop motor circuit running from line A to line B as follows: line A, lead 82, master controller 45, lead 85, carriage control 50, lead 105 (which becomes active after the circuit is broken between leads 85 and 103), scoop automatic control 51, lead 106, safety switch 49 (which was brought to a position to close the break between leads 106 and 107 during the operation of the wing mechanism), lead 107, solenoid 108, and from thence to line B, thus energizing solenoid 108 and closing the circuit to the scoop, motor 29, which has the effect of starting the scoop inverting operation and at the same time starting the movement of the scoop control 51. As this circuit is completed only through carriage control 50, it will be understood that the latter provides a timing action in this circuit effective to prevent operation of the scoop motor until the carriage mechanism has reached a predetermined position. This operation of the scoop motor continues until the circuit is broken between leads 105 and 106 in the scoop control 51, through the coasting of the fingers of that control off of the contacts of these leads, thus breaking the scoop motor circuit, after which the parts coast to a position where the scoop control comes to rest with the coacting parts on the line XX of the scoop control 51, this completing the scoop inverting operation. As shown in Fig. 8, this scoop inverting operation is immediately followed by the return movement of the carriage, this latter being provided through completing a circuit from line A to line B as follows: line A, lead 82, master controller 45, lead 85, lead 110 (carriage control 50), scoop control 51, lead 109, safety switch 48, lead 111, solenoid 112, to line B, the completion of which circuit energizes solenoid 112 and closes the carriage motor circuit in a manner to reverse the direction of travel of the carriage motor from the previous operation, which action has the effect of withdrawing the carriage from the retort and returning it to its back position. As will be seen, the completion of this circuit is dependent upon the bridging of leads 109 and 110 in scoop control 51, leads 85 and 110 having been previously bridged. As a result, the scoop control 51 acts as a timing element in controlling the carriage return movement, insuring that the carriage will not begin this movement until the scoops are in the desired position. This return movement of the carriage continues until this circuit through solenoid 112 is broken in the carriage control 50 through the break between leads 85 and 110, this break permitting the mechanism to coast to position which leaves the parts on the line W on control 50. In reaching this latter position, a circuit is established to provide the scoops arighting operation which, as shown in Fig. 8, follows the carriage return, this circuit being completed as follows: line A, lead 82, master controller 45, lead 85, carriage control 50, lead 86, scoop control 51, lead 113, to lead 106 on said control, and thence to line B in the manner heretofore described, through safety switch 49, lead 107, solenoid 108, to line B, the effect being that solenoid 108 is again energized to close the scoop motor circuit, causing the latter to continue its operation and that of its control 51 until the circuit is broken between lead 86 and lead 113 in the scoop control 51, whereupon, the parts coast to the position shown by the line X of scoop control 51. As will be seen, this circuit is completed only when the carriage control has reached a predetermined position, so that the operation of the scoop motor to aright the scoops is timed by the carriage operation, thus insuring the beginning of the scoops-arighting operation at the proper time.

As shown in Fig. 8, the scoops-arighting operation is followed by the closing of the wings, and these two operations are shown as overlapping. This effect is produced through the completion of a circuit from line A to line B as follows: line A, lead 82, master controller 45, lead 114, scoop control 51, lead 115, wing control 47, lead 93, point 83, of wing manual control 41, lead 91, solenoid 92, to line B, thus energizing solenoid 92 and closing the wing motor circuit to operate the wing mechanism to close the wings. The closing of this circuit begins the second operation of the wing motor, which through the completion of the circuit between leads 114 and 115 in the scoop control, causes the latter to provide a timing element in the operation of the wing motor, and since the circuit is completed prior to the end of the scoop control movement, an overlapping in the operations of the wing and scoop motors is provided.

Inasmuch as the scoop motor completes its operation before the completion of the wing-closing operation, the wing motor circuit is rearranged to continue the operation started when the circuit was completed in the scoop control. This rearrangement is provided by breaking the circuit just described within the wing control, the break being between leads 115 and 93, the rearranged circuit following that of the original circuit for the wing motor, viz., from lead line A to line B as follows: line A, lead 82, master controller 45, lead 94, wing control 47, lead 94$^a$, lead 93, point 83 on wing manual control, lead 91, solenoid 92, to line B. This rearrangement is provided without stopping the wing motor operation, the break being small to permit the coasting action to carry the wing control to a point where the rearranged circuit becomes effective. As will be seen, this wing motor operation is timed as to commencement by the scoop control, and, consequently, absolute surety is had that the scoop mechanism will be in a predetermined position before any action is had in connection with the closing of the wings. This wing motor operation continues until the circuit is broken through the leads in the wing control, the parts coasting to a position which leaves the make-and-break devices on the line Y of wing control 47, the position of this control at the starting of the cycle of operations being described. During the latter part of the travel of the wing control to this position, a circuit is established to start the feeder operation (indicated at P in Fig. 8), which overlaps the wing-closed operation, as shown in said figure. This circuit leads from line A to line B as follows: line A, lead 82, master controller 45, lead 96, wing control 47, lead 116, to a point 116$^a$ on feeder motor control 46, lead 116$^b$, point 116$^c$ on feeder manual control 44, lead 116$^d$, solenoid 118, to line B, thus closing the motor circuit for the feeder motor and starting the feeder operation. Since the completion of this circuit is within the wing control, it will be understood that the latter control provides a timing element in the starting of the feeder action; however, the movement of the wing control 47 causes this circuit to be broken between leads 96 and 116 in said wing control, and the continued action on the feeder motor is provided by a rearranged circuit which leads from line A to line B as follows: line A, lead 117, feeder control 46, lead 116$^b$, point 116$^c$, lead 116$^d$, solenoid 118, to line B, this circuit continuing the operation of the feeder motor until the control 46 automatically breaks it in the operation of the apparatus. As will be seen, this cycle of operations is controlled automatically throughout, the only manual operation required being at the beginning, and that being provided in order that the time when the charging operation shall take place may be entirely under the control of the operator. During this cycle, the scoops (in which the charge had been placed by the operation of the preceding cycle) are entered into the retort to be charged without liability of damage to the equipment, are inverted to place the charge in position within the retort, are withdrawn, are again provided with a charge ready for the next cycle. As will be understood, safety devices, etc., control the various operations so as to prevent action which would tend to damage the equipment, these all operating independently of any manipulation by the operator and thus eliminating the human element in this cycle of operations. During this automatic operation of the cycle, it will be noted that the carriage motor has operated in both directions, while the wing, scoop, and feeder motors have operated in one direction only, the parts being so arranged as to permit this result to be obtained. However, it may be found necessary, during the operation of the machine or for testing purposes, to reverse the direction of wing and scoop motor travel, or to provide for independent action of motors, and this action is provided by the use of the manual controls and the master controller, the latter being shifted in order to permit the various manual controls to be operated (all of the manual controls, with the exception of the wing control 41, being out of circuit when the master controller is in the automatic position indicated at R in Fig. 10). These various non-automatic operations are provided by the following manipulations: When it is desired to manipulate the wings without reference to the remaining parts, the master controller is moved to the position indicated at S, thus providing circuit connections from lead line A to point 84 of the wing manual control 41 as follows: line A, lead 82, master controller 45, lead 90, to point 84. If the lever of control 41 be moved to connect points 83 and 84, the circuit will be continued from point 84 to point 83, lead 91, solenoid 92, to line B, thus completing the motor circuit to drive the wing motor in the direction employed in the automatic operation. If the handle of the control 41 be moved to connect point 84 with point 120, the circuit from point 84 will be completed through point 120, lead 121, solenoid 122, to line B, which has the effect of reversing the motor circuit connections and driving the wing motor in the reverse direction. This manual operation enables the parts to be placed in proper position in case of difficulty or a breaking down of the automatic operation or through emergency necessities, the reverse movement of the wing motor enabling the parts to be positioned without necessitating a complete movement in the automatic direction.

Should it be desired to provide a manual control of the carriage independently of the automatic cycle, the master controller 45 is first moved to the position indicated at S which enables the wing mechanism to be operated, and the wing motor circuit is closed, as previously described, to move the wings to open position. When in this position, the master controller 45 is then shifted to the position indicated at T which has the effect of completing a circuit to point 42$^a$ of the carriage manual control as follows: line A, lead 82, master controller 45, lead 140, to point 42$^a$. If the handle of the manual control 42 be moved to connect points 42$^a$ and 42$^b$, a circuit to line B will be completed from point 42$^a$ through point 42$^b$, lead 141, to the switch 71, lead 97, make-and-break device 69, lead 98, point 99, lead 100, to the carriage safety switch 48, lead 101, solenoid 102, to line B; any attempt to move the carriage with the wings closed would cause damage to parts of the equipment, and it is necessary that the wings be raised in advance of any movement of the carriage. If the handle of the manual control 42 be moved in a direction to connect point 42$^a$ with point 42$^c$, the circuit from point 42$^a$ to line B will be completed through point 42$^c$, lead 109, to carriage safety switch 48, lead 111, solenoid 112, to line B, thus reversing the direction of operation of the carriage motor, a result intended to move the carriage to its carriage-back position. This latter operation is one which may be brought into use as an emergency, in case of difficulty being encountered during the forward movement of the scoops into the retort or during the inverting movement of the scoops. If difficulty be had at any time during these operations under the automatic action, the operator may move the master controller to the position indicated at T (the wings having been raised under the automatic operation), and immediately connect points 42$^a$ and 42$^c$ of the manual control 42, with the result that the carriage motor will be reversed and the carriage withdrawn regardless of the particular portion of the preceding operations which may be taking place, thus withdrawing the scoops and preventing their destruction by the intense heat of the retort. As indicated, this carriage-forward circuit would include the make-and-break device 69. As heretofore pointed out, this latter can be by-passed by the use of the switch mechanism shown in Fig. 5 which is manually manipulated and which would act to connect lead 141 direct to lead 100 in the switch 71, thus enabling the machine to be tested when away from the retort.

Should it be desired to operate the scoop mechanism separately from the automatic operation, the wings are first raised, after which the master controller is moved to the position indicated at U, the result being that a circuit is completed to the point 43$^a$ of manual control 43 as follows: line A, lead 82, master controller 45, lead 142, to point 43$^a$. If the handle of the control 43 is moved to connect point 43$^a$ with point 43$^b$, the circuit from point 43$^a$ to line B will be completed through point 43$^b$, lead 143, to scoop safety switch 49, lead 107, solenoid 108, to line B, the wing mechanism having been operated to raise the wings in order that no damage to equipment may be provided by the scoop-turning operation, this wing-raising movement having the effect of placing the safety switches 48 and 49 in proper positions for completing the circuits. The circuit just described will close the motor circuit to operate the scoop motor in the direction of automatic travel. Should the handle of control 43 be moved to connect point 43$^a$ with point 43$^c$, the circuit from point 43$^a$ to line B with be completed through point 43$^c$, lead 144, to scoop safety switch 49, lead 145, solenoid 146, to line B, thus completing the motor circuit to operate the scoop motor in the reverse direction, and enabling the scoops to be returned to a proper position without completing the entire cycle of scoop operation.

Should it be desired to operate the feeder independent of the remaining mechanism, the master controller is moved to the position indicated at V, thus establishing a circuit to point 44$^a$ of control 44 as follows: line A, lead 82, master controller 45, lead 147, to point 44$^a$. Should the handle of control 44 be moved to connect point 44$^a$ with point 116$^c$, the circuit to line B will be completed from point 44$^a$ through point 116$^c$, lead 116$^d$, solenoid 118, to line B, thus completing the motor circuit to the feeder motor.

As will be readily understood, these manual operations thus described, are independent of the automatic controls 46, 47, 50 and 51, the latter taking up the work when the master controller is moved to the automatic position indicated at R.

As will be readily seen, the general arrangement of parts and the arrangement of control and safety devices provides for an operation of the charging and discharging mechanism in such manner as to tend to eliminate liability of damage to the equipment, while the entire operation is under the control of a single operator, the various inter-control features reducing the labor as well as the necessity for careful attention to the complete detailed operations on the part of the operator, as well as reducing liability of error on his part.

What we claim is:—

1. A carriage, a platform frame on the carriage, a fuel charging and discharging device on the platform frame, a motor therefor, a motor operated closure for the charger and discharger, a feeder for the charger, a motor therefor, a circuit common to all the motors, and a master controller for the circuit adapted to control all of said motors.

2. A carriage, a platform frame on the carriage, a fuel charging and discharging device on the platform frame, a motor therefor, a motor operated closure for the charger and discharger, a feeder for the charger, a motor therefor, a circuit common to all the motors, a master controller for the circuit, motor driven means for imparting a vertical movement to the platform frame, and a circuit therefor independent of the first circuit.

3. A carriage, a platform frame on the carriage, a fuel charging and discharging device on the platform frame, a motor therefor, a motor operated closure for the charger and discharger, a feeder for the charger, a motor therefor, a circuit common to all the motors, a master controller for the circuit, motor driven means for imparting a vertical movement to the platform frame, a circuit therefor independent of the first circuit, a motor for the carriage, and a circuit therefor.

4. A carriage, means for receiving a charge, means for discharging the charge from the receiving means, means for imparting a reciprocating movement to the discharge means, controlling means common to and controlling the operations of the receiving means, discharging means and said movement-imparting means for providing a predetermined cycle of operations to the several means, and means controlling the starting of such cycle.

5. In combination with a gas retort having a support, a carriage, a vertically reciprocatory frame on the carriage, discharging means on the vertically reciprocatory frame, and coacting means on the retort support and carriage to indicate when the carriage is in position to permit operation of the charger and discharger.

6. In combination with a stack of gas benches, retorts therein, a carriage, a vertically reciprocatory frame on the carriage, charger and discharger means on the vertically reciprocating frame, and coacting means on the stack and carriage to control the time of operation of the charger and discharger.

7. In combination with a stack of gas benches, retorts therein, a carriage, a vertically reciprocatory frame on the carriage, a charger and discharger on the reciprocatory frame, motor operated wings for the charger and discharger, and coacting means on the stack and carriage to permit the charger and discharger to operate.

8. In combination with a stack of gas benches, retorts therein, a carriage having travel movements along the face of the stack, a charging and discharging device, and means automatically controlled by the travel movements of the carriage for indicating when the discharging device is in position with respect to a retort to be charged.

9. In a charging and discharging apparatus, for gas retorts, a carriage, a vertically reciprocatory frame on said carriage, a fuel charge and discharge mechanism on the carriage, wing elements adjacent the charging and discharging device, means for permitting said wing means to operate, and means for preventing said wing means from operating when said charge and discharge mechanism is out of predetermined positions.

10. In a charging and discharging apparatus for gas retorts, travel mechanism for controlling movements of the apparatus lengthwise of a stack of retorts, a carriage, a vertically reciprocatory frame, a charging and discharging means carried by the vertically reciprocatory frame, means for admitting fuel to the charging mechanism, means for discharging fuel therefrom, and means for permitting a discharge of the fuel only at definitely spaced intervals along the apparatus path of travel.

11. In combination with a gas generator, of a discharging and charging apparatus therefor comprising a movable frame, a combined charger and discharger carried on said frame, an electric motor for moving the frame, an electric motor for the charger and discharger, electrical alinement indicating means for the charger and discharger carried on the frame, contact means on the frame and coacting contact means on the generator, said contact means constituting make and break means for the circuit leading to the motor for the charger and discharger, and a common source of current for the motors and alinement indicating means.

12. In gas generating apparatus and in combination, a retort structure, a charging machine adapted to introduce charges of coal thereinto, and indicating means on the charging machine, said retort structure and charging machine having complemental means adapted to coöperate with the indicating means during travel of the machine lengthwise of the structure to automatically produce operations of the indicating means to indicate the position of the charger relatively to a predetermined retort.

13. The combination with a retort structure and a charging machine adapted to travel to and fro lengthwise of and relatively to the structure, of means, including indicating mechanism, for automatically providing a visual indication on the charging machine of the relative positions of the machine charger and a predetermined retort, said means being controlled by the travel of the charging machine, such travel being adapted to produce the operations of the indicating mechanism.

14. The combination with a retort structure, and a charging machine adapted to travel to and fro relatively to the structure, of means for automatically providing a visual indication on the charging machine of the relative positions of the machine charger and a predetermined retort, said means including a plurality of signals rendered active individually by the travel of the machine.

15. The combination with a retort structure, and a charging machine adapted to travel to and fro relatively to the structure, of means for providing a visual indication on the charging machine of the relative positions of the machine charger and a predetermined retort, said means including a plurality of signals rendered active individually by the travel of the machine, the activity of either signal being dependent upon the particular relative positions of the charger and the retort.

16. The combination with a retort structure, and a charging machine adapted to travel to and fro relatively to the structure, of means for providing a visual indication on the charging machine of the relative positions of the machine charger and a predetermined retort, said means including a plurality of signals carried by the charging machine, and coöperating mechanism on the machine and structure adapted to render the signals active individually by the travel of the charging machine.

17. The combination with a retort structure, and a charging machine adapted to travel to and fro relatively to the structure and having a charger adapted to be introduced into an open retort, of means rendered active by the travel of the charging machine for controlling the time of operation of the charger.

18. The combination with a retort structure, and a charging machine adapted to travel to and fro relatively to the structure and having a charger adapted to be introduced into an open retort, of means rendered active by the travel of the charging machine for controlling the time of operation of the charger, said means being effective to limit the time of charger activity to periods when the charger is in substantial alinement with the retort.

19. In combination, a retort charging machine having a motor-operated carriage mechanism, a motor-operated scoop mechanism, and a motor-operated mechanism for intermittently closing the conduit leading to the scoop mechanism, circuits for the motors of said mechanisms, and make and break devices in said circuits for automatically controlling the operations of said motors to provide the following successive operations of the mechanism: Remove the inclosing means, move the carriage forward to position the scoop structure in the retort, invert the scoops to dump the charge, return the carriage with the scoops inverted, aright the scoops when the carriage has returned, and return the conduit closing means to closed position.

20. In combination, a retort charging machine having a motor-operated carriage mechanism, a motor-operated scoop mechanism, and a motor-operated mechanism for intermittently closing the conduit leading to the scoop mechanism, circuits for the motors of said mechanisms, and make and break devices in said circuits for automatically controlling the operations of said motors to provide the following successive operations of the mechanism: Remove the inclosing means, move the carriage forward, to position the scoop structure in the retort, invert the scoops to dump the charge, return the carriage with the scoops inverted, aright the scoops when the carriage has returned, and return the conduit closing means to closed position, and a manual controller for beginning the sequence of operations at will.

21. In combination, a retort charging machine having a motor-operated carriage mechanism, a motor-operated scoop mechanism, and a motor-operated wing mechanism, circuits for the motors of said mechanisms, and make and break devices in said circuits for automatically controlling the operations of said motors to provide an initial operation of the wing motor, the circuit for said motor having make and break points within said carriage and scoop motor controls, whereby the movement of the wing motor will be dependent upon the positions of the remaining mechanisms.

22. In combination, a retort charging machine having a motor-operated carriage mechanism, a motor-operated scoop mechanism, and a motor-operated wing mechanism; circuits for the motors of said mechanisms, and make and break devices in said circuits for automatically controlling the operations of said motors to provide an initial operation of the wing motor, the circuit for said motor having make and break points within said carriage and scoop motor controls, whereby the movement of the wing motor will be dependent upon the positions of the remaining mechanisms, and a manual controller for beginning the wing operation at will.

23. In combination, a retort charging machine having a motor-operated carriage mechanism, a motor-operated scoop mechanism, and a motor-operated wing mechanism, circuits for the motors of said mechanisms, and make and break devices in said circuits for automatically controlling the operations of said motors to provide an initial operation of the wing motor, the circuit for said motor having make and break points within said carriage and scoop motor controls, whereby the movement of the wing motor will be dependent upon the positions of the remaining mechanisms, said wing control being movable with the wing motor.

24. In combination, a retort charging machine having a motor-operated carriage mechanism, a motor-operated scoop mechanism, and a motor-operated wing mechanism, circuits for the motors of said mechanisms, and make and break devices in said circuits for automatically controlling the operations of said motors to provide an initial operation of the wing motor, the circuit for said motor having make and break points within said carriage and scoop motor controls, whereby the movement of the wing motor will be dependent upon the positions of the remaining mechanisms, said wing control being movable with the wing motor, the movement of said wing control automatically breaking the circuit through said carriage and scoop controls at a predetermined point in the wing control operation.

25. In combination, a retort charging machine having a motor-operated carriage mechanism, a motor-operated scoop mechanism, and a motor-operated wing mechanism, circuits for the motors of said mechanisms, and make and break devices in said circuits for automatically controlling the operations of said motors to provide an initial operation of the wing motor, the circuit for said motor having make and break points within said carriage and scoop motor controls, whereby the movement of the wing motor will be dependent upon the positions of the remaining mechanisms, said wing control being movable with the wing motor, the movement of said wing control automatically breaking the circuit through said carriage and scoop controls at a predetermined point in the wing control operation, the wing motor circuit being continued active by an automatic rearrangement of the wing motor circuit.

26. In combination, a retort charging machine having a motor-operated carriage mechanism, a motor-operated scoop mechanism, and a motor-operated wing mechanism, circuits for the motors of said mechanisms, and make and break devices in said circuits for automatically controlling the operations of said motors to provide an initial wing motor operation.

27. In combination, a retort charging machine having a motor-operated carriage mechanism, a motor-operated scoop mechanism, and a motor operated wing mechanism, circuits for the motors of said mechanisms, a master controller, make and break devices in said circuits for automatically controlling the operations of said motors to provide an initial wing motor operation, and a manual controller for beginning the wing motor operation at will, said wing motor control being movable with the wing motor, with the wing motor circuit completed through the master controller.

28. In combination, a retort charging machine having a motor-operated carriage mechanism, a motor-operated scoop mechanism, and a motor-operated wing mechanism, circuits for the motors of said mechanisms, a master controller, make and break devices in said circuits for automatically controlling the operations of said motors to provide an initial wing motor operation, and a manual controller for beginning the wing motor operation at will, said wing motor control being movable with the wing motor, with the wing motor circuit completed through the master controller, said wing motor circuit also having make and break points in the carriage and scoop motor controls, the wing motor control being formed to provide for an automatic rearrangement of the wing motor circuit through the master controller at a predetermined point in the movement of the wing motor control.

29. In combination, a retort charging machine having a motor-operated carriage mechanism, a motor-operated scoop mechanism, and a motor-operated wing mechanism, circuits for the motors of said mechanisms, a master controller, make and break devices in said circuits for automatically controlling the operations of said motors to provide an initial wing motor operation, and a manual controller for beginning the wing motor operation at will, said wing motor control being movable with the wing motor, with the wing motor circuit completed through the master controller, said wing motor circuit also having make and break points in the carriage and scoop motor controls, the wing motor control being formed to provide for an automatic rearrangement of the wing motor circuit through the master controller at a predetermined point in the movement of the wing motor control, said rearrangement including a by-passing of the carriage and scoop motor controls.

30. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, the completion of the circuit for the carriage motor being dependent upon the movement of the wing motor control.

31. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, the completion of the circuit for the carriage motor being dependent upon the movement of the wing motor control, said wing motor circuit having make and break points in the controls of the carriage and scoop motor circuits.

32. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing motor control having a make and break device in the carriage motor circuit for automatically beginning the carriage motor operation after after the wing motor control has reached a predetermined point in its travel.

33. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing motor control having a make and break device in the carriage motor circuit for automatically beginning the carriage motor operation after the wing motor control has reached a predetermined point in its travel, said carriage motor circuit also having a safety switch controlled by the operations of the wing motor, said switch preventing completion of the carriage motor circuit excepting when the wing mechanism is in predetermined position.

34. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing motor control having a make and break device in the carriage motor circuit for automatically beginning the carriage motor operation after the wing motor control has reached a predetemined point in its travel, and a make and break device within the carriage motor circuit rendered active and inactive by the travel of the charging machine, the activity of said carriage motor circuit through the operation of said wing control being dependent upon the closing of the circuit at said latter make and break device.

35. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing motor control having a make and break device in the carriage motor circuit for automatically beginning the carriage motor operation after the wing motor control has reached a predetermined point in its travel, said carriage motor circuit also having a safety switch controlled by the operations of the wing motor, said switch preventing completion of the carriage motor circuit excepting when the wing mechanism is in predetermined position, and a make and break device within the carriage motor circuit and rendered active and inactive by the travel of the charging machine, the activity of said carriage motor circuit through the operation of said wing control being dependent upon the closing of the circuit at said latter make and break device, said safety switch also having make and break points within the carriage motor circuit to control the completion of this circuit under the action of the wing control.

36. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing control having a make and break structure for the completion of the carriage motor circuit at a predetermined point in the travel of the wing control, said wing and carriage controls automatically rearranging the carriage motor circuit to by-pass the wing control at a predetermined point in the travel of the latter control.

37. In combination, a charging machine having a motor operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing control having a make and break structure for the completion of the carriage motor circuit at a predetermined point in the travel of the wing control, said wing and carriage controls automatically rearranging the carriage motor circuit to by-pass the wing control at predetermined points in the travel of both controls.

38. In combination, a charging machine having a motor-operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing control having a make and break structure for the completion of the carriage motor circuit at a predetermined point in the travel of the wing control, said wing and carriage controls automatically rearranging the carriage motor circuit to by-pass the wing control at a predetermined point in the travel of the latter control, said initial carriage motor circuit including a make and break device rendered active and inactive by the travel of the charging machine, the rearrangement of said circuit also by-passing this latter make and break device.

39. In combination, a charging machine having a motor operated carriage mechanism, a motor-operated scoop mechanism, and a motor-operated wing mechanism, circuits for the motors of said mechanisms, and make and break devices in said circuits for automatically controlling the operations of said motors, said devices providing an initial movement of the wing motor and its automatic control, said wing control having a make and break structure for the completion of the carriage motor circuit at a predetermined point in the travel of the wing control, said wing and carriage controls automatically rearranging the carriage motor circuit to by-pass the wing control at a predetermined point in the travel of the latter control, said carriage circuit also having a safety switch controlled by the operations of the wing motor, said safety switch being active to complete the carriage motor circuit solely when the wing mechanism has moved from a predetermined position.

40. In combination, a charging machine having a motor-operated carriage mechanism, a motor-operated scoop mechanism, and a motor-operated wing mechanism, circuits for the motors of said mechanisms, and an automatic control element for each of said mechanisms and adapted to operate in synchronism therewith, said elements having make and break devices in the various circuits, whereby the movement of one element will be dependent upon the positions of the control elements of other mechanisms.

41. In combination, a charging machine having a motor-operated carriage mechanism, a motor-operated scoop mechanism, and a motor-operated wing mechanism, circuits for the motors of said mechanisms, and an automatic control element for each of said mechanisms and adapted to operate in synchronism therewith, said elements having make and break devices in the various circuits, whereby the movement of one element will be dependent upon the positions of the control elements of other mechanisms, and a master controller, certain of said control elements and the master controller having devices adapted to automatically rearrange motor circuits during the movement of an element.

42. In combination a charging machine having a motor-operated carriage mechanism, a motor-operated scoop mechanism, and a motor-operated wing mechanism, circuits for the motors of said mechanisms, and an automatic control element for each of said mechanisms and adapted to operate in synchronism therewith, said elements having make and break devices in the various circuits, whereby the movement of one element will be dependent upon the positions of the control elements of other mechanisms, and a master controller, certain of said control elements and the master controller having devices adapted to automatically rearrange motor circuits during the movement of an element, said rearranging action serving to by-pass interlocking controls.

43. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanism, the wing motor circuit having make and break devices in each of said controls.

44. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, the wing motor circuit having make and break devices in each of said controls, the wing control element having means coöperating with the master controller for automatically rearranging the wing motor circuit during the travel of said control element after completion of the wing motor circuit.

45. In combination a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, the wing motor circuit having make and break devices in each of said controls, the wing control element having means coöperating with the master controller for automatically rearranging the wing motor circuit during the travel of said control element after completion of the wing motor circuit, said rearrangement of the wing motor circuit being operative to by-pass the make and break devices of that circuit in the control elements of the other mechanisms.

46. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices for the wing motor circuit, said devices acting to provide spaced-apart movements to the wing motor during a complete cycle of wing control element operation.

47. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices for the wing motor circuit, said devices acting to provide spaced-apart movements to the wing motor during a complete cycle of wing control element operation, the time length of the period between wing motor operations being controlled by movements of the control elements of the remaining mechanisms.

48. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices for the wing motor circuit, said devices acting to provide spaced-apart movements to the wing motor during a complete cycle of wing control element operation, said wing control element also having make and break devices for the carriage motor circuit.

49. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices for the wing motor circuit, said devices acting to provide spaced-apart movements to the wing motor during a complete cycle of wing control element operation, said wing control element also having make and break devices for the carriage motor circuit, said devices being rendered active to close the carriage motor circuit during the movement of the wing control element prior to the dwell in the wing motor operation provided by said spaced-apart movements.

50. In combination, a retort charging machine having motor-operated carriage mechanism, motor-operated scoop mechanism and motor-operated wing mechanism, circuits for the motors of said mechanisms; a master controller, and an automatic control element for each of said mechanisms and adapted to be moved in synchronism with the movements of said mechanisms, said wing control element having make and break devices for the wing motor circuit, said devices acting to provide spaced-apart movements to the wing motor during a complete cycle of wing control element operation, said wing control element also having make and break devices for the carriage motor circuit, said devices being rendered active to close the carriage motor circuit during the movement of the wing control element prior to the dwell in the wing motor operation provided by said spaced-apart movements the completion of the carriage motor circuit acting to move the carriage control element, said latter element having a make and break device brought into activity by the movement of the element to automatically rearrange the carriage motor circuit to by-pass the make and break devices of that circuit on the wing control element.

51. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices coöperating with the master controller and with make and break devices on the controls of the remaining mechanisms to initially provide make and break points in the wing motor circuit in each of the control elements, whereby said wing motor circuit may be completed only when said control elements are in predetermined positions.

52. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices coöperating with the master controller and with make and break devices on the controls of the remaining mechanisms to initially provide make and break points in the wing motor circuit in each of the control elements, whereby said wing motor circuit may be completed only when said control elements are in predetermined positions, said wing control element having additional make and break devices coöperating with the master controller and rendered active to complete the wing motor circuit during the travel of the wing control element, said latter devices and the master controller automatically rearranging said wing motor circuit to by-pass the make and break devices of said initial circuit within the remaining control elements.

53. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices coöperating with the master controller and with make and break devices on the controls of the remaining mechanisms, to initially provide make and break points in the wing motor circuit in each of the control elements, whereby said wing motor circuit may be completed only when said control elements are in predetermined positions, said wing control element carrying make and break devices adapted to automatically complete an operating circuit to the carriage motor independent of the carriage control element during the movement of the wing control element, whereby the beginning of carriage control element movement will be dependent upon the prior movement of the wing control element.

54. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices coöperating with the master controller and with make and break devices on the controls of the remaining mechanisms to initially provide make and break points in the wing motor circuit in each of the control elements, whereby said wing motor circuit may be completed only when said control elements are in predetermined positions, said wing control element carrying make and break devices adapted to automatically complete an operating circuit to the carriage motor independent of the carriage control element during the movement of the wing control element, whereby the beginning of carriage control element movement will be dependent upon the prior movement of the wing control element, said carriage control element having make and break devices automatically brought into activity by the movements of the carriage control element and adapted to automatically rearrange the carriage motor circuit to place it under the control of the carriage control element.

55. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices coöperating with the master controller and with make and break devices on the controls of the remaining mechanisms to initially provide make and break points in the wing motor circuit in each of the control elements, whereby said wing motor circuit may be completed only when said control elements are in predetermined positions, said wing control element carrying make and break devices adapted to automatically complete an operating circuit to the carriage motor independent of the carriage control element during the movement of the wing control element, whereby the beginning of carriage control element movement will be dependent upon the prior movement of the wing control element, said carriage control element having make and break devices automatically brought into activity by the movements of the carriage control element and adapted to automatically rearrange the carriage motor circuit to place it under the control of the carriage control element, said scoop control element having make and break devices in the carriage motor circuit brought into activity by the rearrangement of that circuit.

56. In combination, a retort charging machine having motor-operated carriage mechanism, motor-operated scoop mechanism and motor-operated wing mechanism, circuits for the motors of said mechanisms, a master controller, and an automatic control element for each of said mechanisms and adapted to be moved in synchronism with the movements of said mechanisms, said wing control element having make and break devices coöperating with the master controller and with make and break devices on the controls of the remaining mechanisms to initially provide make and break points in the wing motor circuit in each of the control elements, whereby said wing motor circuit may be completed only when said control elements are in predetermined positions, said wing control element carrying make and break devices adapted to automatically complete an operating circuit to the carriage motor independent of the carriage control element during the movement of the wing control element, whereby the beginning of carriage control element movement will be dependent upon the prior movement of the wing control element, said carriage control element having make and break devices automatically brought into activity by the movements of the carriage control element and adapted to automatically rearrange the carriage motor circuit to place it under the control of the carriage control element, the carriage motor circuit make and break devices of the wing control element being automatically rendered inactive by movements of that element, whereby automatic transfer of control of the carriage motor circuit is had from the wing control element to the carriage control element.

57. In combination, a motor operated carriage mechanism, a motor-operated scoop mechanism, and a motor-operated closure mechanism, circuits for the motors of said mechanisms, a master controller, and an individual automatic control for each of said mechanisms, said master controller being positionable to coöperate with said individual controls to provide an automatic sequential operation of said mechanisms.

58. In combination, a motor-operated carriage mechanism, a motor-operated scoop mechanism, and a motor-operated closure mechanism, circuits for the motors of said mechanisms, a master controller, and an individual automatic control for each of said mechanisms, said master controller being positionable to coöperate with said individual controls to provide an automatic sequential operation of said mechanisms, one of said motor circuits including a manual control having a make and break point, said automatic sequential operation being dependent upon the closing of the circuit at said point.

59. In combination, a motor-operated carriage mechanism, a motor-operated scoop mechanism, and a motor-operated closure mechanism, circuits for the motors of said mechanisms, a master controller, and an individual automatic control for each of said mechanisms, said master controller being positionable to coöperate with said individual controls to provide an automatic sequential operation of said mechanisms, each of said motor circuits including a manual control, the manual control of one of the circuits being operative with the master controller in connection with said automatic operation.

60. In combination, a motor-operated carriage mechanism, a motor-operated scoop mechanism, and a motor-operated closure mechanism, circuits for the motors of said mechanisms, a master controller, and an individual automatic control for each of said mechanisms, said master controller being positionable to coöperate with said individual controls to provide an automatic sequential operation of said mechanisms, said wing motor circuit including a manual control having a make and break point, said automatic sequential operation being dependent upon the closing of the circuit at said point.

61. In combination, a motor-operated carriage mechanism, a motor-operated scoop mechanism, and a motor-operated closure mechanism, circuits for the motors of said mechanisms, a master controller, and an individual automatic control for each of said mechanisms, said master controller being positionable to coöperate with said individual controls to provide an automatic sequential operation of said mechanisms, each of said motor circuits including a manual control, the manual control of one of the circuits being operative with the master controller in connection with said automatic operation, said master controller being movable to permit each of the manual controls to be effective with respect to its individual circuit.

62. In combination, a motor-operated carriage mechanism, a motor-operated scoop mechanism, and a motor-operated closure mechanism, circuits for the motors of said mechanisms, a master controller, and an individual automatic control for each of said mechanisms, said master controller being positionable to coöperate with said individual controls to provide an automatic sequential operation of said mechanisms, each of said motor circuits including a manual control, the manual control of one of the circuits being operative with the master controller in connection with said automatic operation, said master controller being movable to permit each of the manual controls to be effective with respect to its individual circuit, certain of said motors being rotative in one direction during the automatic operation, and being rotative in opposite directions when under manual control.

63. In combination, motor-operated carriage mechanism, motor-operated scoop mechanism, and motor-operated wing mechanism, circuits for the motors of said mechanisms, a master controller, and individual automatic controls for the circuits of said motors, said wing automatic control being adapted to complete the carriage motor circuit to begin the carriage motor operation, said wing and carriage automatic controls coöperating with the carriage motor circuit to provide an automatic transference of the control while the carriage motor is active.

64. In combination, motor-operated carriage mechanism, motor-operated scoop mechanism, and motor-operated wing mechanism, circuits for the motors of said mechanisms, a master controller, and individual automatic controls for the circuits of said motors, said wing automatic control being adapted to complete the carriage motor circuit to begin the carriage motor operation, said wing and carriage automatic controls coöperating with the carriage motor circuit to provide an automatic transference of the control while the carriage motor is active, said carriage motor circuit including a make and break point controlled by the alined relation between the scoop mechanism and the retort to be charged.

65. In combination, motor-operated carriage mechanism, motor-operated scoop mechanism, and motor-operated wing mechanism, circuits for the motors of said mechanisms, a master controller, and individual automatic controls for the circuits of said motors, said wing automatic control being adapted to complete the carriage motor circuit to begin the carriage motor operation, said wing and carriage automatic controls coöperating with the carriage motor circuit to provide an automatic transference of the control while the carriage motor is active, said carriage motor circuit including a make and break point controlled by the alined relation between the scoop mechanism and the retort to be charged, the transference of control from the wing to the carriage automatic control serving to by-pass said make and break point.

66. In combination, motor-operated carriage mechanism, motor-operated scoop mechanism, and motor-operated wing mechanism, circuits for the motors of said mechanisms, a master controller, and an automatic control for each mechanism, said controls and the master controller being operative to provide an automatic sequence of operations including movements of the carriage motor in opposite directions with a time interval between operations, the initial movement of the carriage motor in one direction being controlled by the wing automatic control and in the other direction by the position of the scoop automatic control.

67. In combination, motor-operated carriage mechanism, motor-operated scoop mechanism, and motor-operated wing mechanism, circuits for the motors of said mechanisms, a master controller, and an automatic control for each mechanism, said controls and the master controller being operative to provide an automatic sequence of operations including movements of the carriage motor in opposite directions with a time interval between operations, the initial movement of the carriage motor in one direction being controlled by the wing automatic control and in the other direction by the position of the scoop automatic control, said wing and carriage automatic controls coöperating with the carriage motor circuit to provide an automatic transference of control to the carriage control during the operation of the motor.

68. In combination, motor-operated carriage mechanism, motor-operated scoop mechanism, and motor-operated wing mechanism, circuits for the motors of said mechanisms, a master controller, and an automatic control for and operated by each of said mechanisms to provide an automatic sequence of operations, said scoop control having independent make and break points effective in the wing motor circuit and coöperating with the wing automatic control to provide operations of the wing motor at timed intervals.

69. In combination, motor-operated carriage mechanism, motor-operated scoop mechanism, and motor-operated wing mechanism, circuits for the motors of said mechanisms, a master controller, and an automatic control for and operated by each of said mechanisms to provide an automatic sequence of operations, said scoop control having independent make and break points effective in the wing motor circuit and coöperating with the wing automatic control to provide operations of the wing motor at timed intervals, said points on the scoop control being rendered active successively by the travel of that control.

70. In combination, motor-operated carriage mechanism, motor-operated scoop mechanism, and motor-operated wing mechanism, circuits for the motors of said mechanisms, a master controller, and an automatic control for and operated by each of said mechanisms to provide an automatic sequence of operations, said carriage and scoop controls each having a pair of make and break points effective in the scoop motor circuit to control the time of operation of the scoop motor.

71. In combination, motor-operated carriage mechanism, motor-operated scoop mechanism, and motor-operated wing mechanism, circuits for the motors of said mechanisms, a master controller, and an automatic control for and operated by each of said mechanisms to provide an automatic sequence of operations, said carriage and scoop controls each having a pair of make and break points effective in the scoop motor circuit to control the time of operation of the scoop motor, the points on said carriage control acting to determine the time of operation.

72. In combination, motor-operated carriage mechanism, motor-operated scoop mechanism, and motor-operated wing mechanism, circuits for the motors of said mechanisms, automatic make and break devices in said circuits for providing an automatic sequence of operations, said make and break devices including a safety device operable with the wing mechanism, for preventing movements of the carriage mechanism when said wing mechanism is out of a predetermined position.

73. In combination, motor-operated carriage mechanism, motor-operated scoop mechanism, and motor-operated wing mechanism, circuits for the motors of said mechanisms, automatic make and break devices in said circuits for providing an automatic sequence of operations, said make and break devices including a safety device operable with the wing mechanism for preventing movements of the carriage mechanism when said wing mechanism is out of a predetermined position, said make and break devices including a safety device operated by the wing mechanism for preventing movement of the scoop mechanism when said wing mechanism is out of a predetermined position.

74. In combination, motor-operated carriage mechanism, motor-operated scoop mechanism, and motor-operated wing mechanism, circuits for the motors of said mechanisms, automatic make and break devices in said circuits for providing an automatic sequence of operations, said make and break devices including a pair of safety devices operated by the wing mechanism, one of said devices being effective in the carriage motor circuit, the other of said devices being effective in the scoop motor circuit, said devices serving to prevent movements of the respective mechanisms excepting when the wing mechanism is in predetermined positions.

75. In combination, motor-operated carriage mechanism, motor-operated scoop mechanism, and motor-operated wing mechanism, circuits for the motors of said mechanisms, automatic make and break devices in said circuits for providing an automatic sequence of operations, and a manual control for the scoop motor circuit, said make and break devices including a safety switch operated by the wing mechanism for preventing movement of the scoop mechanism when the wing mechanism is out of a predetermined position, said safety device having a pair of make and break points, both points being effective in the scoop circuit under manual control, one of said points being ineffective under automatic control.

76. In combination, a bench of retorts, a charging mechanism movable parallel with the front of the retorts, electrical devices for operating said charging mechanism, a safety line-up device effective in the closure of the operating circuits for said electrical mechanism when the charging mechanism is in operating alinement with a predetermined retort, and means for by-passing said line-up device after said charging mechanism has commenced operation.

77. In combination, a bench of retorts, a charging mechanism movable parallel with the front of the retorts, electrical devices for operating said charging mechanism, a safety line-up device effective in the closure of the operating circuits for said electrical mechanism when the charging mechanism is in operating alinement with a predetermined retort, and means for by-passing said line-up device after said charging mechanism has commenced operation, and an auxiliary switch operable at will for permitting movements of the charging mechanism when said safety line-up mechanism is out of its alining portions.

78. In combination, motor-operated carriage mechanism, motor-operated scoop mechanism, motor-operated wing mechanism, and motor-operated feeder mechanism, circuits for the motors of said mechanisms, a master controller, and an automatic control for and operated by each of said mechanisms to provide an automatic sequence of operations, said wing control acting as a timing element in the feeder motor circuit.

79. In combination, motor-operated carriage mechanism, motor-operated scoop mechanism, motor-operated wing mechanism, and motor-operated feeder mechanism, circuits for the motors of said mechanisms, a master controller, and an automatic control for and operated by each of said mechanisms to provide an automatic sequence of operations, said wing control acting as a timing element in the feeder motor circuit, said control having a make and break point within the feeder motor circuit for automatically beginning feeder motor operation at a predetermined point in the movement of the wing control.

80. In combination, motor-operated carriage mechanism, motor-operated scoop mechanism, motor-operated wing mechanism, and motor-operated feeder mechanism, circuits for the motors of said mechanisms, a master controller, and an automatic control for and operated by each of said mechanisms to provide an automatic sequence of operations, said wing control acting as a timing element in the feeder motor circuit, said control having a make and break point within the feeder motor circuit for automatically beginning feeder motor operation at a predetermined point in the movement of the wing control, said wing control and feeder control coöperating to provide a transference of control of the feeder motor during the operation of the latter.

81. In combination, motor-operated carriage mechanism, motor-operated scoop mechanism, said mechanisms being adapted to position a charge in a retort, circuits for the motors of said mechanisms, wing mechanism adapted to coöperate with the scoop mechanism in the formation of a charge, means for operating said wing mechanism to move it from and to its charge forming position, and a make and break device operative in the carriage motor circuit, said device providing an interruption in said circuit when the wing mechanism is in the charge forming position.

82. In combination, motor-operated carriage mechanism, motor-operated scoop mechanism, said mechanisms being adapted to position a charge in a retort, circuits for the motors of said mechanisms, wing mechanism adapted to coöperate with the scoop mechanism in the formation of a charge, means for operating said wing mechanism to move it from and to its charge forming position, and a make and break device operative in the carriage motor circuit, said device providing an interruption in said circuit when the wing mechanism is in the charge forming position, said device being movable to close said interruption with the movement of the wing mechanism out of its charge forming position.

83. In combination, motor-operated carriage mechanism, motor-operated scoop mechanism, said mechanisms being adapted to position a charge in a retort, circuits for the motors of said mechanisms, wing mechanism adapted to coöperate with the scoop mechanism in the formation of a charge, means for operating said wing mechanism to move it from and to its charge forming position, and a make and break device operative in the scoop motor circuit, said device providing an interruption in said circuit when the wing mechanism is in the charge forming position.

84. In combination, motor-operated carriage mechanism, motor-operated scoop mechanism, said mechanisms being adapted to position a charge in a retort, circuits for the motors of said mechanisms, wing mechanism adapted to coöperate with the scoop mechanism in the formation of a charge, means for operating said wing mechanism to move it from and to its charge forming position, and a make and break device operative in the scoop motor circuit, said device providing an interruption in said circuit when the wing mechanism is in the charge forming position, said device being movable to close said interruption with the movement of the wing mechanism out of its charge forming position.

85. In combination, motor-operated carriage mechanism, motor-operated scoop mechanism, said mechanisms being adapted to position a charge in a retort, circuits for the motors of said mechanisms, wing mechanism adapted to coöperate with the scoop mechanism in the formation of a charge, means for operating said wing mechanism to move it from and to its charge forming position, and independent make and break devices in said carriage motor and scoop motor circuits, each adapted to provide an interruption in its circuit when the wing mechanism is in charge forming position.

86. In combination, motor-operated carriage mechanism, motor-operated scoop mechanism, said mechanisms being adapted to position a charge in a retort, circuits for the motors of said mechanisms, wing mechanism adapted to coöperate with the scoop mechanism in the formation of a charge, means for operating said wing mechanism to move it from and to its charge forming position, and independent make and break devices in said carriage motor and scoop motor circuits, each adapted to provide an interruption in its circuit when the wing mechanism is in charge forming position, said devices being movable with the wing mechanism and operative to close said interruptions by movements of the wing mechanism from its charge forming position.

In testimony whereof, we affix our signatures in presence of two witnesses.

HENRY A. CARPENTER.
ROBERT L. HIBBARD.
ARTHUR W. WARNER.

Witnesses:
ADA M. STEELE,
M. J. STEELE.

Copies of this patent may be obtained for five cents each, by addressing the "Commissioner of Patents, Washington, D. C."